INVENTORS
DAVID H. FLEMING, JR.
BRUCE C. OLMSTEAD, JR.

United States Patent Office 3,169,851
Patented Feb. 16, 1965

3,169,851
PROCESS FOR THE OXIDATION OF POWDERS
David H. Fleming, Jr., Chatham, and Bruce C. Olmsted, Jr., Tonawanda, N.Y., assignors to Union Carbide Corporation, a corporation of New York
Filed Feb. 4, 1960, Ser. No. 6,740
4 Claims. (Cl. 75—.5)

This invention relates to the production of oxidized powdered metals and, more particularly, concerns the oxidation of high carbon ferrochrome powder for producing low-carbon ferrochrome.

In the present practice of producing low carbon ferrochrome, comminuted high carbon ferrochrome is mixed with comminuted chrome ore, iron ore, and/or silica (depending on grade desired) and an organic binder in amounts and proportions such that the contained oxygen in the ore is sufficient to oxidize the carbon in the high carbon ferrochrome and binder. The mix is then briquetted and the briquets are heated in vacuum under such operating conditions that the carbon is oxidized and removed as carbon monoxide giving a low-carbon end product. This method known as solid phase reduction is disclosed in U.S. Patent No. 2,776,882.

The use of ores or silica as a decarburizing agent introduces undesirable gangue materials, such as alumina, magnesia, and silica, in the end product and thereby increases the slag burden on the steel furnace.

Among the oxidants that have been proposed in the decarburization of ferrochromium is oxidized ferrochromium. This oxidant is desirable because it has the basic metal ingredients of the desired end product. By oxidizing high carbon ferrochrome powder as completely as is practical and then using this oxidized ferrochrome in place of the ore or silica, the gangue can be eliminated and the final ferrochrome product improved. However, ferrochromium alloy, when oxidized, forms a tightly adherent oxide film which prevents further oxidation and consequently great difficulty has been encountered in oxidizing it.

It is also well known in the prior art that carbon-containing ferrochromium is relatively exothermic when heated at or near its fusion point in an oxidizing atmosphere, and great difficulty has been encountered in attempting to roast this material. When once ignited, such material oxidizes rapidly with release of much heat and attendant rapid rise in temperature. Uncontrolled oxidation and fusion of the material result. Oftentimes, the temperature of the roaster rises to a point where serious damage is done to the roasting apparatus. Equally important is the fact that uncontrolled oxidation and fusion of the material are objectionable, in that large masses are formed that are not amenable to subsequent processing.

Attempts have been made to avoid the disadvantages of the prior art by forming carbon-containing ferrochromium into massive granules and roasting the granules in an oxidizing atmosphere. However, as a result of temperature and granule size limitations, it is not commercially feasible to completely oxidize the charge by roasting means because of the poor production rates that are achieved; therefore, the resultant product is, at best, a partially oxidized product. Additionally, the carbon-containing ferrochromium that is fed to the roaster contains a percentage of undesirable slag impurities. Even with careful cleaning of the feed material, some slag always remains. In the roaster, this slag, which has a lower fusion point than the ferrochromium, fuses and separates from the metal. The slag, however, adheres to the surfaces of the roaster and, thereby, necessitates periodic clean-outs of the equipment with consequent down time.

Other similar means have been attempted but, due to temperature or particle size limitations, or both, only a partially oxidized ferrochrome product is feasible.

Up to now there has been no commercially satisfactory way of making a high oxygen-containing ferrochromium alloy. It is the general purpose of this invention, therefore, to provide a process for the production of oxidized ferrochromium that contains sufficient oxygen so that it may be employed in the solid phase reduction of high carbon ferrochromium to carry the process to completion, thereby greatly reducing the bulk of total material being handled, and also reducing the introduction of impurities into the furnace. In addition, the oxidized ferrochrome of this invention prevents serious heat damage to the furnace equipment employed in the oxidation of the high carbon ferrochromium.

It is a primary object of the present invention to provide a novel method for oxidizing metal powder at a temperature above the fusion point of the metal without incipient melting or fusing of the metal powder.

Another object of the invention is to provide a method wherein the solid phase oxidation of high carbon ferrochromium may be performed at higher temperatures and with faster reaction rates than heretofore without detrimental effects.

Another object of the invention is to provide a method for oxidizing high carbon ferrochromium powder without materially contaminating the oxidized product with foreign materials.

Another object of the invention is to provide an improved method of decarburizing and desulfurizing a high carbon ferrochromium powder.

Another object of the invention is to provide a novel apparatus useful in the production of oxidized metal powder.

Other objects, features and advantages of the invention will be apparent from the following detailed description of a preferred embodiment thereof, taken in conjunction with the drawings in which.

The invention will be described hereinafter with reference to the oxidation of high carbon ferrochromium powder. However, it is to be understood that the invention is not limited to such material, but is useful in the oxidation of other metal powders, such as ferromanganese, ferronickel, ferrocobalt, ferrosilicon, ferrotitanium, ferrovanadium, and ferrotungsten.

The objects of the invention may be achieved primarily by directing a gas-borne or fluidized stream of finely-divided high carbon ferrochromium at high velocity through an oxidizing medium such as an oxygen-fuel gas flame at a temperature above the fusion temperature of the ferrochromium. The high rate of speed of ferrochromium particles through the flame avoids fusion and coalescence and provides a rapid means for producing substantially fully oxidized ferrochromium powder. The temperature of the oxidized particles is then rapidly lowered before such particles have an opportunity to fuse and form a sticky mass. In addition to being substantially completely oxidized, the average particle size of the resulting powder product remains approximately the same as, and more often less than, the average particle size of the starting material. This constitutes a definite advantage, as it eliminates a costly and time-consuming regrinding operation.

We have found that most satisfactory results are obtained in the oxidation of ferrochrome particles when each ferrochrome particle in the starting material is isolated from contact with other ferrochromium particles during oxidation. A preferred means of doing this is to fluidize or suspend the ferochrome particles in a carrier gas, preferably air, although oxygen or oxygen-enriched air may be employed, if so desired. By preference, the supply of oxygen surrounding the suspended particles of high carbon ferrochromium is increased during the passage of the ferrochrome powder through the oxygen-fuel gas flame in order to insure substantially complete combustion and formation of oxides. For this purpose, the amount of oxygen that is employed should be in excess of the theoretical amount required to combine with all the carbon in the high carbon ferrochrome particles.

Figure 1:
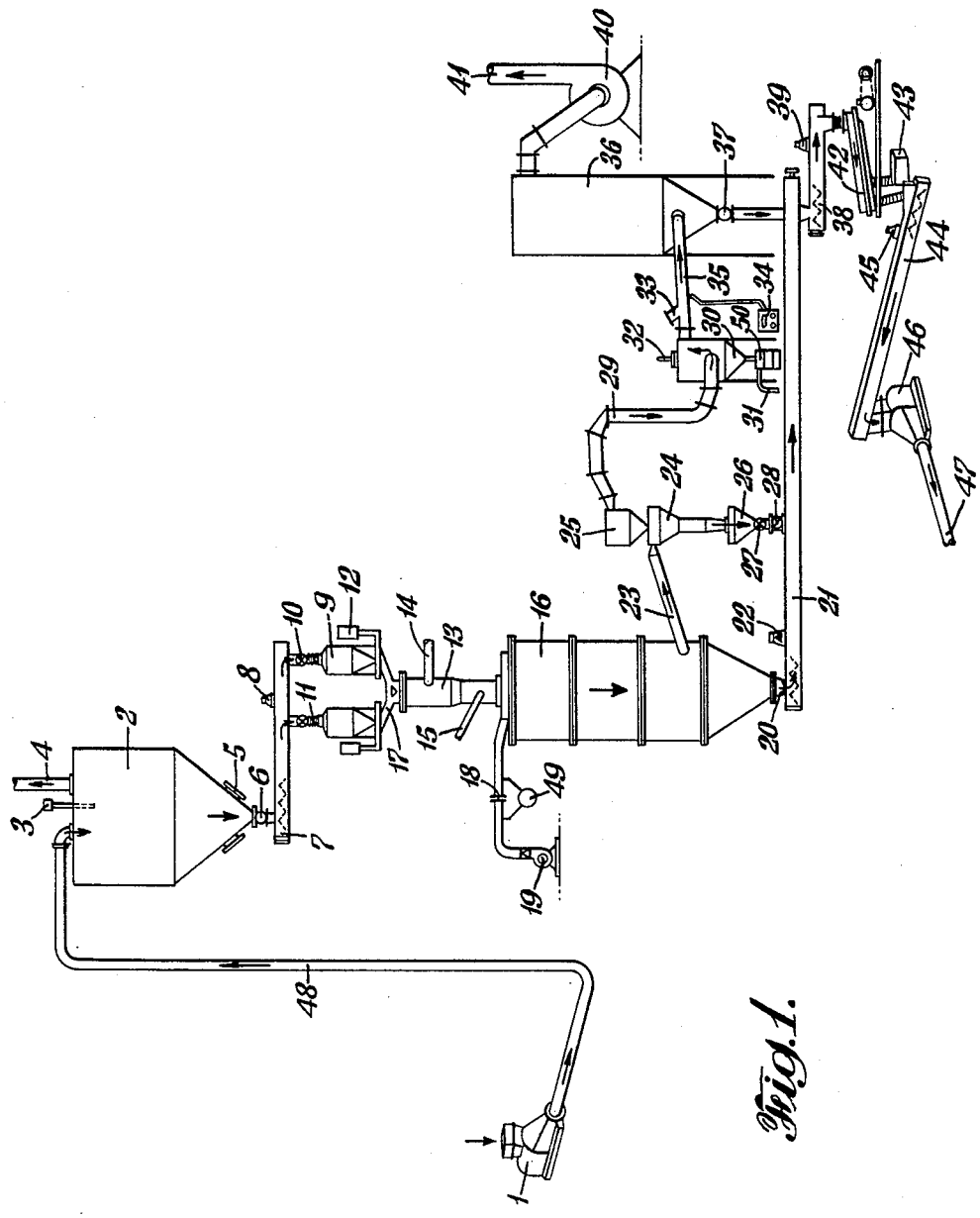
FIGURE 1 is a diagrammatic sketch of an illustrative apparatus embodying the principles of the invention.

FIGURE 1 is a diagrammatic flow sheet of a ferrochrome powder oxidizing installation embodying features of the invention. High carbon ferrochrome powder is introduced into a pump 1 which delivers the comminuted material to a storage bin 2 through a connecting duct 48. The storage bin 2 may be supplied with a suitable bin level indicator 3 and aeration units 5. It may be connected by means of duct 4 to a dust collector to recover any dust lost at this particular point.

From the storage bin the material is passed through a rotary feeder 6 to a suitable conveyor to a screw conveyor 7 which delivers the material to suitable dispensing mechanism 9. Powder dispensers such as those disclosed in U.S. Patent No. 2,803,533 are suitable for this purpose. A suitable valving arrangement 8 may be provided as a pressure release to prevent pressure build up in the system. A pair of dispensers 9 are connected to conveyor 7 through valves 10 and flexible rubber connections 11. Weighing means 12 is provided to indicate the amount of powder fed from dispensers 9. Alternate feeding of the powder to the reactor 16 from the dispenser may be provided.

Figure 2:
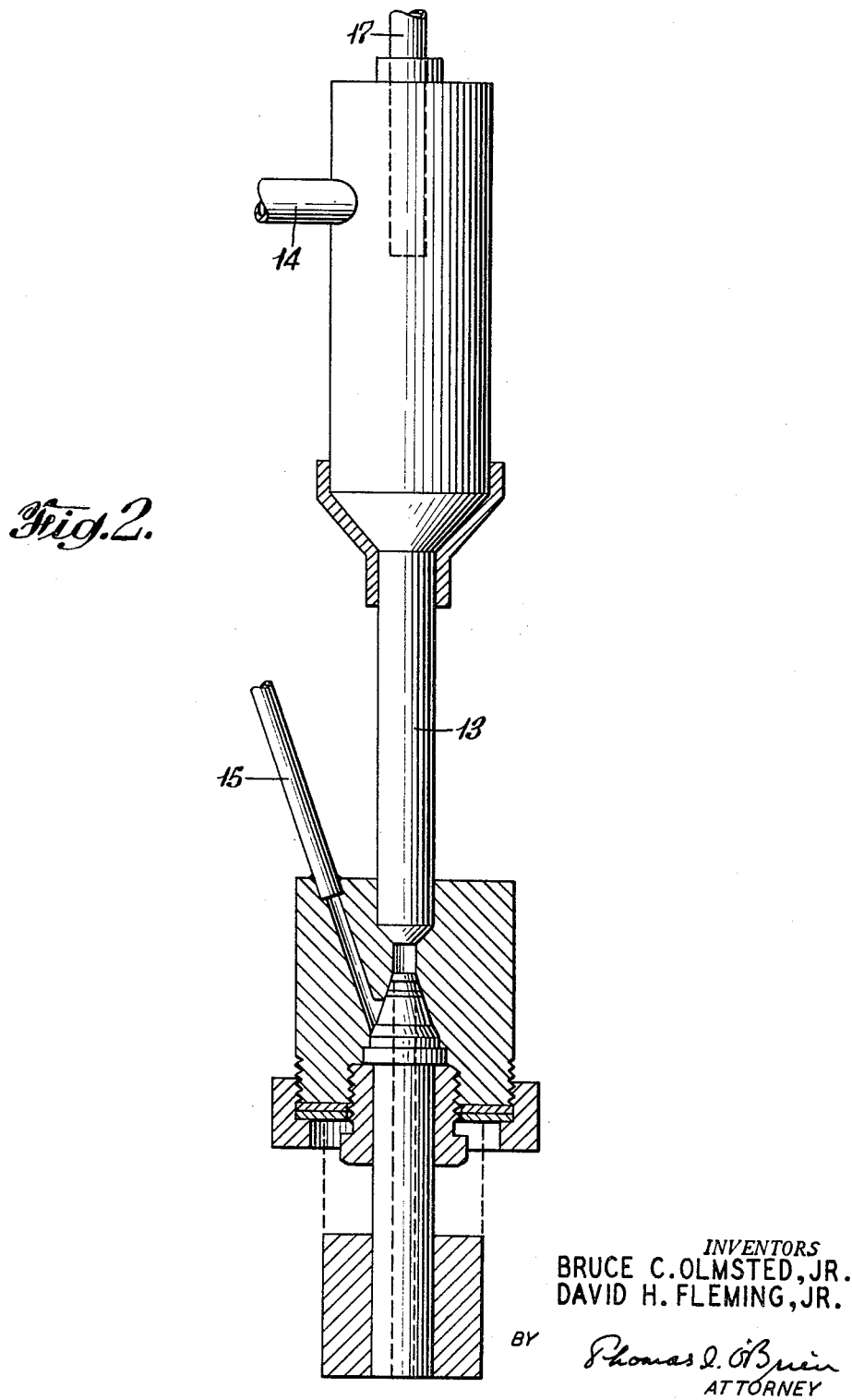
FIGURE 2 is an enlargement of a nozzle suitable for use in the apparatus of FIGURE 1.

Predetermined amounts of ferrochrome are fed through conduit 17 into jet burner 13 which in turn feeds into reactor 16. Secondary air may be fed into the burner through pipe 14 while fuel gas and oxygen are injected through pipe 15. The details of a suitable burner are shown in FIGURE 2. The feeding tube which delivers the comminuted material is desirably directly centered on the burner itself, and the ferrochrome is introduced vertically into the jet flame zone.

The burner is mounted on top of the refractory lined reaction chamber 16. Air for oxidation is supplied by blower 19, the amount being regulated by a suitable orifice 18 in the connecting duct. A manometer 49 may be utilized for visual determination of the pressure.

The refractory lining in reaction chamber 16 is essential to retain heat in the oxidation chamber. Oxidized ferrochrome falls by gravity into the reaction chamber to a water cooled hopper at the bottom where the heavy material is passed through outlet 20 and deposited on a screw conveyor 21.

An induced draft fan 40 draws air from reaction chamber 16 through duct 23, dry cyclone 24 and fines collector 25 where the finer oxidized particles are sucked through a gas cooling chamber 30. The cooling chamber 30 is connected to a steel drum 50 having overflow 31 to remove any excess water which was injected into cooling chamber 30 through line 32. The finer oxidized particles are subsequently drawn through duct 35 to a dust collector 36 from which the induced draft is blown to the atmosphere through duct 41. In view of the relatively low temperature which can be tolerated by the dust collector 36 all equipment from duct 23 to the collector 36 is water-cooled to reduce the temperature to within acceptable limits. The last cooling is done in duct 35 by bleeding cold air through inlet 33 in amounts controlled pneumatically by temperature controller 34.

All coarser material which is deposited on the screw conveyor 21 joins with additional ferrochrome oxide admitted to the conveyor through collection hopper 26, collection valve 27 and dust valve 28, and also with the residual material which is collected in the dust collector 36 which is deposited on the conveyor through a rotary feeder 37. Valve 22 provides control against pressure build up and is similar to valve 8 described previously.

The screw conveyor 21 discharges its load onto a second screw conveyor 38 which serves to transfer material to a vibrating screen 42. Screen 42 separates the oxidized ferrochrome into oversized and correctly sized particles. The oversized particles are delivered to a container 43 for subsequent rehandling while the balance is passed to a screw conveyor 44 which in turn discharges to pump 46. Pump 46 delivers the product through duct 47 to a suitable storage bin to await subsequent use. Valve 39 on conveyor 38 and valve 45 on conveyor 44 are similar in design and have a similar purpose to valve 8 of conveyor 7.

Figure 3:
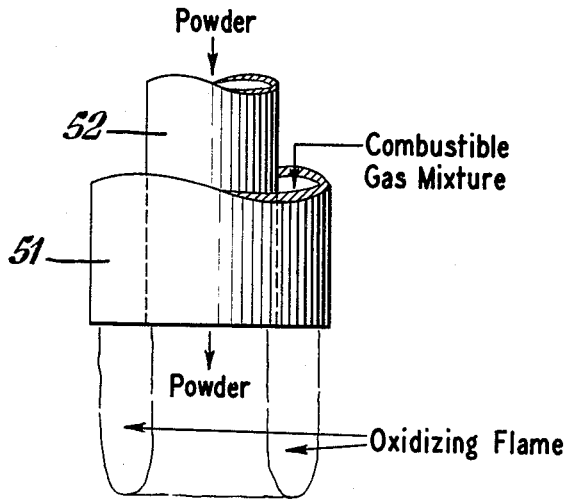
FIGURE 3 is an enlargement of the lower end of the nozzle shown in FIGURE 2.

In the modification shown in FIGURE 3, the fluidized powder from tube 52 and the combustible gas mixture from nozzle 51 are post mixed directly in the oxidizing flame.

Figure 4:
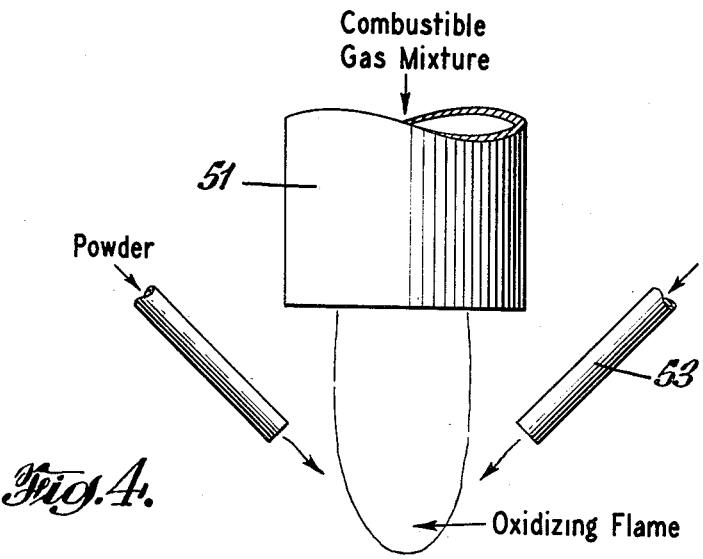
FIGURE 4 is a modification of the portion of the nozzle shown in FIGURE 3.

In the modification shown in FIGURE 4, the fluidized high carbon ferrochrome may be fed directly into the flame jet in the oxidation zone through a series of smaller diameter tubes 53 arranged annularly about the nozzle 51, so that the fluidized ferrochrome powder converges in the flame jet.

It is desirable in the oxidation of the ferrochrome powder that sufficient oxygen be present to insure substantially complete oxidation thereof. By preference, this may be accomplished by supplying supplementary oxygen-bearing gas into the reaction zone through conduit means from pump 19 or by means of openings (not shown) in the refractory lined portion of the reactor 16. In this manner, the rapid heating and oxidation of the ferrochrome powder is completed without fusion in a relatively short residence period, which is approximately the time required for the powder to pass through the oxidizing flame.

We have found that a reaction chamber having an inside diameter of approximately 3′ 6″ and a length of approximately 18 feet, of which approximately the upper third is lined, produces favorable results. This size reaction chamber is sufficiently large to accommodate multiple burners to attain a higher production rate.

In the oxidation of the ferrochromium particles, the fumes given off contain very small particles of metal oxides in the sub-micron particle size range. It has been found necessary to recover these dust particles of oxidized ferrochromium in order to obtain a continuously oxidized high carbon ferrochrome on a production basis.

In accordance with the invention, there is provided an improved dust collecting apparatus which in combination with the oxidation of high carbon ferrochrome powder affords means for the continuous, large scale production of oxidized ferrochrome powder. As shown in the drawings, the oxidized ferrochromium powder is collected in three stages. In the first stage, the heavier oxidized particles fall by gravity through the reaction chamber 16 to the cooling zone which is terminated in the form of a hopper, where the oxidized particles may be conveniently removed through the discharge 20. The lighter dust-like particles of oxidized ferrochrome are drawn by an induced draft or high suction fan 40 through a duct 23 into the second stage of collection comprising a dry cyclone 24 where the heavier portion of the dust-like particles is collected in a hopper 26 provided with a valve controlled discharge chute 28. The high suction fan 40 aids in providing the necessary air flow to oxidize the ferrochrome powder, particularly at production rates over about 10 lbs. of ferrochrome/min.

The finer portion of the oxidized ferrochromium particles in the dry cyclone 24 is drawn through a duct 29 into a spray chamber 30 to suitably reduce the temperature of the powder for further processing in a dust collector bag. Water spray is introduced into the spray chamber 30 through a water inlet 32 in an amount sufficient to substantially cool the ferrochromium powder and vaporize the cooling water without wetting the particles of oxidized ferrochromium. We have found that by use of the water spray, the gas temperature to the dust collector could be maintained below approximately 250° F. Any residual cooling that may be desired may be accomplished by an air bleed 33 in the outlet from the spray chamber. Because the powder is in the dry state, there is no necessity to filter and dry it. The thus cooled, fine, oxidized ferrochromium particles are subsequently drawn through a duct 35 to one or more dust collectors 36 constituting the third collection stage, where the remaining dust particles are substantially completely removed, and the induced draft is exhausted to the atmosphere through duct 41. The residual oxidized ferrochromium powder collected in dust collector 36 can be removed by a suitable discharge 37. The presence or absence of dust particles in the gas which is exhausted to the atmosphere may be determined by visual observation.

In the preferred practice of the invention, finely comminuted high carbon ferrochrome having a particle size of approximately 300 mesh is employed although ferrochrome as coarse as 100 mesh and as fine as 400 mesh can be satisfactorily processed.

The combustible mixture of oxygen and fuel gas may comprise any suitable fuel gas, such as methane, propane, butane or other natural or manufactured gases capable of producing an oxidizing flame, propane being preferred. When using propane a 5-to-1 ratio of oxygen to fuel is preferred.

An important feature of the invention is the temperature at which oxidation occurs. At temperatures less than 1300° C., fractional or partial oxidation occurs, the oxygen content of ferrochromium being raised approximately 10 percent. This is equivalent to approximately one-third of the possible total oxygen content of fully oxidized ferrochrome. Temperatures above 1700° C. are for the most part unsatisfactory because fusion and agglomeration of the oxidized ferrochromium particles become significant. With consideration for these factors, the preferred oxidizing flame temperature is between about 1300° C. and 1700° C., a temperature of approximately 1600° C. being highly desirable.

From a number of tests the following conditions have been found to produce desirable results:

| | |
|---|---|
| Temperature of exhaust gases from reaction chamber 16 containing submicron particles of oxidized ferrochromium | Approx. 600° C. |
| Temperature of exhaust gases entering spray chamber 30 | Approx. 350° C. |
| Temperature of exhaust gases leaving spray chamber 30 | Approx. 130° C. |
| Pressure in oxidizing zone of reaction chamber 16 | Positive. |
| Pressure in lower portion of reaction chamber 16 | Approx. minus 3″ $H_2O$. |
| Pressure differential across dust collector 36 | Approx. 5″ $H_2O$. |
| Gallons per minute of cooling water in spray chamber 30 | Approx. 0.7. |

In order to insure complete combustion of the high carbon ferrochromium particles, an excess of oxygen over that stoichiometrically required is maintained in the oxidation zone. By preference, sufficient oxygen is employed to maintain up to a 20 percent excess of oxygen over that required to balance the oxidation reaction for 100 percent theoretical oxidation.

In order to indicate still more fully the nature of the present invention, the following examples of typical procedures are set forth, it being understood that these examples are presented as illustrative only and that they are not intended to limit the scope of the invention.

*Example I*

High carbon ferrochromium was comminuted by a series of crushing steps until 90 percent of the finely-divided material passed through a screen of 325 Tyler mesh (.043 mm. openings). The finely-divided metal had the following chemical analysis.

| | Percent |
|---|---|
| Chromium | 67.62 |
| Iron | 23.90 |
| Carbon | 4.45 |
| Sulphur | 0.077 |
| Silicon | 1.82 |
| Oxygen | 0.32 |
| Minor elements (by diff.) | 1.813 |
| Total | 100.000 |

The sized high carbon ferrochromium was introduced into the reaction furnace of the invention at a rate of 4.4 lbs./min. The reaction proceeded smoothly without fusion under oxidizing conditions at a temperature in the range of 1400° C. to 1680° C. Approximately 135 c.f.m. of air was employed to insure substantially complete oxidation. The oxidized material was cooled and retained to its size distribution of essentially 90 percent through a 325 mesh screen so that a subsequent crushing step was not required.

The cooled oxidized ferrochromium powder had the following chemical analysis:

| | Percent |
|---|---|
| Chromium | 49.61 |
| Iron | 18.76 |
| Carbon | 0.1 |
| Sulfur | 0.017 |
| Silicon | 1.18 |
| Oxygen | 29.40 |
| Minor element (by diff.) | 6.9333 |
| Total | 100.0003 |

From the above example, it will be seen that the oxidation procedure increased the oxygen content of the ferrochromium from about 0.30 percent to 29.4 percent. The ferrochromium product thus formed had an oxygen content of approximately 95 percent of its theoretical capacity.

*Example II*

In this example, a ferrochromium alloy of higher carbon content than the starting material in Example I was employed. The alloy was reduced in size by a series of crushing steps in the same manner described in Example I. The chemical analysis of the crushed high carbon ferrochromium alloy was as follows:

| | Percent |
|---|---|
| Chromium | 66.87 |
| Iron | 22.85 |
| Carbon | 6.52 |
| Sulfur | 0.05 |
| Silicon | 1.49 |
| Oxygen | 0.22 |
| Minor elements (by diff.) | 1.00 |
| Total | 100.00 |

The crushed alloy was introduced into the reactor of the invention at a rate of 5 lbs./min., along with an air stream rate of 180 c.f.m. to ensure substantially complete oxidation. The reaction proceeded smoothly without fusion under oxidizing conditions at a temperature in the range of 1400° C. to 1680° C. The oxidized material, on cooling, retained its sized distribution and had the following chemical analysis:

|  | Percent |
|---|---|
| Chromium | 51.06 |
| Iron | 18.13 |
| Carbon | 0.38 |
| Sulfur | 0.015 |
| Silicon | 1.22 |
| Oxygen | 27.1 |
| Minor elements (by diff.) | 2.095 |
| Total | 100.00 |

The oxygen content of the ferrochromium product of the above examples was thus increased to approximately 87.5 percent of its theoretical capacity.

*Example III*

An increased feed rate of 7.7 lbs./min. was used in feeding the finely-divided ferrochromium alloy into the oxidizing zone of the reaction vessel. The high carbon ferrochromium alloy was produced and sized in the manner described in Example I. The chemical composition of the alloy was as follows:

|  | Percent |
|---|---|
| Chromium | 66.46 |
| Iron | 23.93 |
| Carbon | 4.74 |
| Sulfur | 0.06 |
| Silicon | 1.91 |
| Oxygen | 0.84 |
| Minor elements (by diff.) | 2.06 |
| Total | 100.00 |

An oxygen-enriched air atmosphere was maintained in the reactor using 200 c.f.m. air and 4.8 c.f.m. oxygen. The reaction proceeded without fusion at a temperature in the range of 1400° C. to 1700° C. The oxidized material, on cooling, retained its sized distribution and had the following chemical analysis:

|  | Percent |
|---|---|
| Chromium | 49.87 |
| Iron | 18.07 |
| Carbon | 0.47 |
| Sulfur | 0.02 |
| Silicon | 1.43 |
| Oxygen | 27.80 |
| Minor elements (by diff.) | 2.34 |
| Total | 100.00 |

The ferrochromium alloy was thus oxidized to approximately 89.5 percent of its theoretical capacity.

From the foregoing examples, it will be seen that it is possible to so regulate the oxidizing conditions as to adjustably control the degree of oxidation of the metal product.

*Example IV*

In laboratory test runs employing an oxygen-methane flame supplied with 180 c.f.m. oxygen and 90 c.f.h. methane, approximately 16 oz./min. were fluidized in an air stream of 40 c.f.m. and fed directly into the oxygen-methane flame through a series of feed tubes surrounding the flame. The high carbon ferrochrome powder used had a particle size averaging 4.8 microns, and an analysis of 66.92 percent Cr, 24.69 percent Fe, 1.29 percent Met. Si, 1.14 percent $SiO_2$, 0.059 percent S, and 4.60 percent C. The resulting particles were oxidized up to 95 percent of capacity and had an average size of 2 microns, indicating that the particles shattered or broke apart in the reaction.

*Example V*

In tests conducted in a manner similar to the tests described in Examples I, II and III, the high carbon ferrochromium was supplied to the blowpipe nozzle by feeding it through a tube central to the flame jet. The oxygen level in the oxidation zone was maintained high enough to oxidize to approximately the 27 percent oxygen level. Using a water spray, the temperature of the material going to the gas collector was controllably maintained below 250° F. Data on the final product are as follows:

|  | Run 1 | Run 2 | Run 3 | Run 4 | Run 5 |
|---|---|---|---|---|---|
| Feed Rate, lbs. H.C. FeCr/Min | 4.4 | 10.2 | 5.8 | 7.7 | 8.0 |
| Air Introduced, c.f.m | 135 | 180 | 150–160 |  |  |
| Oxygen Usage, c.f.m | 4.9 | 9.8 | 9.8 |  |  |
| Percent $O_2$ in Product | 29.4 | 21.7 | 27.4 | 27.4 | 26.3 |
| Percent C in Product |  |  |  | .47 | .55 |

Blends of recently produced oxidized ferrochromium analyzed:

| Percent C | Percent $O_2$ | Percent Cr | Percent S |
|---|---|---|---|
| .42 | 28.9 | 50.65 | .027 |
| .56 | 26.2 | 50.49 | .029 |
| .24 | 27.6 | 49.82 | .021 |
| .22 | 27.9 | 49.72 | .028 |

Additional tests to oxidize high carbon ferrochrome powder were made by passing the powder through an oxyacetylene flame. The oxidized product contained approximately 1.0 percent carbon.

From the above description, it will be seen that the present invention provides a method and apparatus for oxidizing high carbon ferrochrome powder to relatively high levels without the occurrence of fusion or agglomeration of the oxidized powder product. The process of the invention comprises comminuting high carbon ferrochromium and injecting the powder suspended in an air and/or oxygen stream through an oxy-fuel gas flame together with an additional quantity of oxygen. By passing the high carbon ferrochromium through the high temperature flame at a high rate of speed, fusion and coalescence of the particles are avoided, oxidation is rapid and substantially complete, and a fine oxidizing powder is produced which is eminently suitable for decarburizing further quantities of high carbon ferrochromium in the well known solid phase reduction process described hereinbefore. The practical product of oxidized ferrochromium powder is made possible by a dust collection system which, in combination with the formation of the oxidized ferrochromium permits a relatively high production rate to be realized.

It is to be understood that although the invention has been described in connection with the oxidation of high carbon ferrochromium powder, modifications and variations may be effected to render the invention susceptible of application to other metals and alloys in other and different apparatus from those disclosed herein without departing from the spirit and scope of the invention.

What is claimed is:

1. A method for oxidizing high carbon ferrochromium powder to form an oxidized and powdered ferrochromium product relatively low in carbon content and relatively high in oxygen content, which method comprises providing in an oxygen bearing gas an oxygen-fuel gas flame maintained at a temperature between about 1300° C. and about 1700° C., fluidizing said ferrochromium powder in an oxygen bearing gas, passing said ferrochromium powder in a fluidized state through said flame at a rate sufficient to avoid substantial fusion and coalescence of said powder during oxidation, maintaining a continuous supply of an oxygen bearing gas in and around said flame to ensure substantially complete oxidation of said ferrochromium powder to form said oxidized and powdered ferrochromium product, and thereafter rapidly cooling said powdered product while in a fluidized state to avoid fusion and coalescence of said product.

2. A method for oxidizing high carbon ferrochromium powder to form an oxidized ferrochromium powder product, which method comprises providing an oxidizing medium at an elevated temperature between about 1300° C. and about 1700° C., said temperature being above approximately the fusion temperature of said high carbon ferrochromium powder and below approximately the temperature at which substantial fusion and agglomeration of said oxidized ferrochromium product become significant during oxidation, fluidizing said ferrochromium powder in a carrier gas, passing said ferrochromium powder in a fluidized state through said oxidizing medium at a rate sufficient to avoid substantial fusion and coalescence of said powder during oxidation, maintaining a supply of oxygen bearing gas into said oxidizing medium to ensure substantially complete oxidation of said ferrochromium powder to form said oxidized ferrochromium powder product, and rapidly cooling said oxidized ferrochromium powder product while in a fluidized state to avoid fusion and coalescence of said product.

3. A method for oxidizing a metal powder selected from the group consisting of ferrochromium, ferromanganese, ferronickel, ferrocobalt, ferrosilicon, ferrotitanium, ferrovanadium, and ferrotungsten to form an oxidized metal powder product thereof, which method comprises providing an oxidizing medium at an elevated temperature above approximately the fusion temperature of said metal powder and below approximately the temperature at which substantial fusion and agglomeration of said oxidized product become significant during oxidation, fluidizing said metal powder in a carrier gas, passing said metal powder in a fluidized state through said oxidizing medium at a rate sufficient to avoid substantial fusion and coalescence of said powder during oxidation, maintaining a supply of oxygen bearing gas into said oxidizing medium to ensure substantially complete oxidation of said metal powder to form said oxidized metal powder product, and rapidly cooling said oxidized metal powder product while in a fluidized state to avoid fusion and coalescene of said product.

4. A method for oxidizing a high carbon ferrochromium powder to form an oxidized ferrochromium powder product, which method comprises providing an oxidizing medium at an elevated temperature between about 1300° C. and 1700° C., said temperature being above approximately the fusion temperature of said high crabon ferrochromium powder and below approximately the temperature at which substantial fusion and agglomeration of said oxidized ferrochromium product become significant during the oxidation, fluidizing said ferrochromium powder in an oxygen bearing carrier gas, passing said ferrochromium powder in a fluidized state through said oxidizing medium at a rate sufficient to avoid substantial fusion and coalescence of said powder during oxidation, maintaining a supply of oxygen bearing gas into said oxidizing medium to ensure substantially complete oxidation of said ferrochromium powder to form said oxidized ferrochromium powder product, and thereafter rapidly cooling said oxidized ferrochromium powder product while in a fluidized state to avoid fusion and coalescene of said product.

References Cited in the file of this patent

UNITED STATES PATENTS

| | | |
|---|---|---|
| 1,630,881 | Zalocostas | May 31, 1927 |
| 1,816,388 | Mittasch et al. | July 28, 1931 |
| 1,893,913 | Jacques | Jan. 10, 1933 |
| 2,006,891 | Hegman | July 2, 1935 |
| 2,186,659 | Vogt | Jan. 9, 1940 |
| 2,422,501 | Roetheli | June 17, 1947 |
| 2,465,978 | Meincke | Mar. 29, 1949 |
| 2,622,048 | Moesinger | Dec. 16, 1952 |
| 2,635,946 | Weber et al. | Apr. 21, 1953 |
| 2,735,796 | Kelley et al. | Feb. 21, 1956 |
| 2,823,982 | Saladin et al. | Feb. 18, 1958 |
| 2,862,792 | Rehm | Dec. 2, 1958 |
| 2,891,846 | Knight | June 23, 1959 |

FOREIGN PATENTS

| | | |
|---|---|---|
| 606,540 | Great Britain | Aug. 16, 1948 |